Dec. 2, 1952 A. A. EGLI 2,619,667
PAN CLEANING UTENSIL HAVING CLOSED WIRE LOOP CLEANING MEANS
Filed March 16, 1948
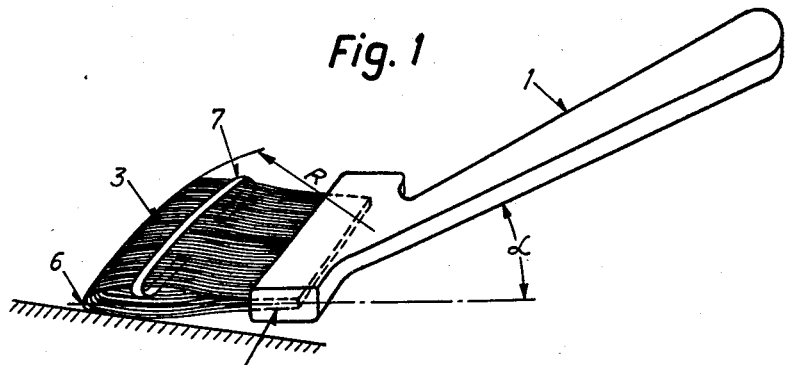
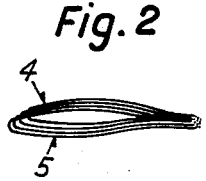 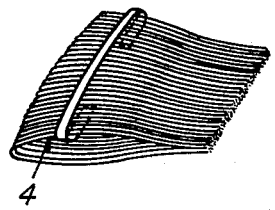
 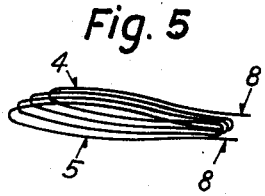
 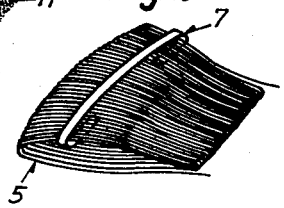
INVENTOR:
Arnold August Egli
BY
Richards Geier
ATTORNEYS Patented Dec. 2, 1952

2,619,667

UNITED STATES PATENT OFFICE 2,619,667

PAN CLEANING UTENSIL HAVING CLOSED WIRE LOOP CLEANING MEANS

Arnold August Egli, Zurich, Switzerland

Application March 16, 1948, Serial No. 15,188
In Switzerland March 18, 1947

2 Claims. (Cl. 15—236)

The present invention relates to an utensil for cleaning pans in which utensil the means serving for the performance of the cleaning operation are secured in a handle which latter is particularly intended to be used for removing the caked deposit left by burnt foodstuffs.

Certain foodstuffs form whilst cooking, even without burning, at the bottom and on the sides of the pan a comparatively thick layer which can only be removed by force. Hitherto bundles of rice-straw or so-called pan-scourers have been used for this purpose, but these are extremely unhygienic as any particles of foodstuff which penetrate between the bristles of this scourer are very difficult to remove. Apart from this, rice-straw is not strong enough to remove hard crusts formed by burnt food. Dishcloths interwoven with metal are also known and are very useful but they present the disadvantage that the person using them damages his fingers and especially his finger nails. Brushes with non-metallic bristles cannot be used for this purpose as the bristles are too soft. Neither are wire brushes suitable, since, if the wire used for such wire brushes is thick enough to provide the necessary strength, it damages the pan; if the wire is thinner, however, it bends backwards and entraps the particles of foodstuff scraped away to such an extent that a wire brush of this type cannot be kept clean.

The present invention aims at providing a utensil by means of which this deposit can easily be removed without damaging the material from which the pan is made. This invention resides in the fact that the means used for cleaning the pan consists of a plurality of wires projecting from a handle and bent back to the handle to form a loop.

In the enclosed drawing typical embodiments of the utensil according to the invention are exemplified as follows:

Fig. 1 a complete utensil,

Fig. 2 a narrow bundle of wire loops,

Fig. 3 a bundle of wire loops in the form of a flat brush,

Fig. 4 a concave bundle of wire loops in the form of a flat brush,

Fig. 5 a narrow bundle of wire loops fashioned by coiling a single length of wire, Fig. 6 a broad bundle of wire loops in the form of a flat brush, fashioned by coiling a single length of wire, Fig. 7 a straight bundle of wires with the ends of the wires soldered together, Fig. 8 the bundle of wires according to Fig. 7 bent backwards and secured at one end in a handle.

The handle 1, which may be made of metal or any plastic or even of wood, has a plurality of wires serving for scouring purposes which project from the handle and are led back into same to form a loop. The ends of the wires, which are assembled to form a broad brush-shaped bundle of wire loops 3 are, as illustrated in Figs. 3, 4, 6 or 8, inserted in the cavity 2. Narrow bundles of wire loops may, however, also be inserted in holes in the handle 1, as in Figs. 2 and 5, as with ordinary brushes. If a die-casting is used for the handle, the bundles of wire loops may be cast in the latter, or if a plastic is used for the handle they can be pressure moulded into the same. If the ends of the bundles of wire loops are to be glued or soldered into the handle, they are expediently soldered or glued together. The ends of the wire loops can, however, be held together by means of clasps until they are glued, soldered, cast or pressure moulded into the handle.

The wire loops are attached to the handle at an angle to the hand-gripped portion thereof of 20° to 40°, preferably 30°, so that they lie, when the handle is comfortably held in the hand, with their longitudinal side on the pan surface to be cleaned.

The bundles of wire loops can be made in two ways: firstly, the wires may be bent in the manner usual when making brushes, in which case the ends of the wire loops, and not the wire loops themselves, are inserted in the handle. The bundles of wire loops may, however, alternatively be made by coiling a length of wire so as to form closed loops, in which case one set of loop ends is inserted in the handle with the wire ends 8 of the wire as shown in Figure 5. In both bending and coiling the wire loops are arranged side by side in such a way that an upper layer of loops 4 and a lower layer of loops 5 are formed. The upper layer of loops 4 is expediently held together in the vicinity of the elbow 6 of the loop by means of a connecting member 7. The individual bundles of loops may, if the utensil consists of such, have one connecting member each or all bundles of loops may be held together by a common connecting member.

Figs. 7 and 8 show an alternative embodiment of the bundle of wire loops. The bent wires 9 are, as shown in Fig. 7, arranged side by side to form a flat bundle and soldered together or held together with some other jointing medium at the ends 10 and 11. This bundle of wires is then, as shown in Fig. 8, bent to unequal lengths, so that the longer end projects beyond the shorter so as to be secured in the handle, whereas the shorter end terminates before the handle.

A spring-hard, corrugated, incorrodible wire of at least 0.25 mm. guage is expediently used for forming the loops. In order to impose less strain on the outermost loops when scouring the pan corners, the wire loops are arranged side by side in such a way that the loop ends together form an arc with the radius R (Fig. 1), which is greater than 50 mm. The bundles of loops may also be concave, as shown in Fig. 4, so that the middle loops press against the bottom of the pan and are subjected to greater strain than the outer ones; the middle loops offer greater resistance than the outer loops, since the middle loops are prevented from moving sidewise by the outer loops which can bend to the sides when pressure is too great.

I claim:

1. A pan-cleaning utensil, comprising a handle, and a row of closed wire loops attached to said handle and located side by side and parallel to each other said loops being elongated and forming two wire layers located one above the other, and a connecting member engaging the wires and holding the wire loops to separate the upper wire layer from the lower wire layer.

2. A pan-cleaning utensil, comprising a handle, and a row of closed wire loops attached to said handle and located side by side and parallel to each other said loops being elongated and forming two wire layers located one above the other, and a clamping member engaging the upper portions of the wire loops and holding the wire loops to separate the upper wire layer from the lower wire layer.

ARNOLD AUGUST EGLI.

REFERENCES CITED

The following references are of record in the file of this patent:

UNITED STATES PATENTS

| Number | Name | Date |
| --- | --- | --- |
| D. 25,394 | Upton | Apr. 14, 1896 |
| 348,067 | Spear | Aug. 24, 1886 |
| 717,456 | Schiele | Dec. 30, 1902 |
| 894,857 | Rogers | Aug. 4, 1908 |
| 905,161 | Ellison | Dec. 1, 1908 |
| 998,022 | Martin | July 18, 1911 |
| 1,198,257 | Morrison | Sept. 12, 1916 |
| 1,381,973 | Davis | June 21, 1921 |
| 1,537,425 | Farwell | May 12, 1925 |
| 1,617,787 | Andrews | Feb. 15, 1927 |
| 1,813,445 | Dowd | July 7, 1931 |
| 1,901,842 | Firtion | Mar. 14, 1933 |
| 1,906,657 | Stowell | May 2, 1933 |
| 1,930,977 | Kirch | Oct. 17, 1933 |
| 2,269,811 | Elwood | Jan. 13, 1942 |

FOREIGN PATENTS

| Number | Country | Date |
| --- | --- | --- |
| 12,256 | Great Britain | of 1887 |
| 240,032 | Great Britain | Sept. 24, 1925 |
| 565,833 | Germany | Dec. 8, 1932 |
| 643,351 | France | Sept. 15, 1928 |